United States Patent
Nakamura

(10) Patent No.: US 11,000,743 B2
(45) Date of Patent: May 11, 2021

(54) GOLF CLUB SHAFT

(71) Applicant: SUMITOMO RUBBER INDUSTRIES, LTD., Kobe (JP)

(72) Inventor: Hirotaka Nakamura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 16 days.

(21) Appl. No.: 16/696,564

(22) Filed: Nov. 26, 2019

(65) Prior Publication Data

US 2020/0164254 A1 May 28, 2020

(30) Foreign Application Priority Data

Nov. 27, 2018 (JP) .............................. JP2018-221187

(51) Int. Cl.
*A63B 53/10* (2015.01)
*A63B 60/06* (2015.01)

(52) U.S. Cl.
CPC .............. *A63B 53/10* (2013.01); *A63B 60/06* (2015.10)

(58) Field of Classification Search
CPC ... A63B 53/10; A63B 60/06; A63B 2209/023; A63B 60/42; A63B 2220/24; A63B 60/0081; A63B 2209/02; B29C 70/32; B29C 70/202; B29L 2031/5227
See application file for complete search history.

(56) References Cited

U.S. PATENT DOCUMENTS

| | | | | |
|---|---|---|---|---|
| 4,000,896 A | * | 1/1977 | Lauraitis | A63B 53/10 473/319 |
| 4,157,181 A | * | 6/1979 | Cecka | A63B 53/10 473/319 |
| 5,242,721 A | | 9/1993 | Oonuki et al. | |
| 5,788,585 A | * | 8/1998 | Jackson | A63B 53/10 473/292 |
| 6,533,677 B1 | | 3/2003 | Sumitomo et al. | |
| 6,773,358 B1 | * | 8/2004 | Sumitomo | A63B 53/10 473/319 |
| 7,906,191 B2 | * | 3/2011 | Pratt | F16F 1/366 428/36.9 |
| 7,972,223 B2 | * | 7/2011 | Lee | A63B 60/54 473/319 |
| 8,827,829 B2 | * | 9/2014 | Nakano | A63B 53/10 473/319 |

(Continued)

FOREIGN PATENT DOCUMENTS

| | | | | | |
|---|---|---|---|---|---|
| JP | 11299944 A | * | 11/1999 | ............. | A63B 53/10 |
| JP | 3669143 B2 | * | 7/2005 | ............. | A63B 60/00 |
| JP | 2009254599 A | * | 11/2009 | ............. | A63B 53/10 |

*Primary Examiner* — Stephen L Blau
(74) *Attorney, Agent, or Firm* — Birch, Stewart, Kolasch & Birch, LLP

(57) ABSTRACT

A golf club shaft includes a tip end, a butt end, a first anisotropic portion that is twisted in a first direction in conjunction with a bending of the golf club shaft at a circumferential bending position, and a second anisotropic portion that is twisted in a second direction in conjunction with the bending. The second anisotropic portion is located on a tip end side relative to the first anisotropic portion. The second direction is opposite to the first direction. In the shaft, the twist accompanied by the bending in the first anisotropic portion can be offset by the twist accompanied by the bending in the second anisotropic portion.

11 Claims, 13 Drawing Sheets

(56) References Cited

U.S. PATENT DOCUMENTS

| | | | |
|---|---|---|---|
| 8,936,515 B2* | 1/2015 | Yashiki | A63B 53/10 473/319 |
| 10,272,302 B2* | 4/2019 | Mordasini | B29C 53/60 |
| 10,376,759 B2* | 8/2019 | Toya | A63B 53/10 |
| 2015/0157906 A1* | 6/2015 | Shimono | A63B 53/10 473/319 |
| 2015/0209631 A1* | 7/2015 | Ehlers | B29C 70/30 473/319 |

* cited by examiner ated so as to be suited to left-handed golf
GOLF CLUB SHAFT The present application claims priority on Patent Application No. 2018-221187 filed in JAPAN on Nov. 27, 2018. The entire contents of this Japanese Patent Application are hereby incorporated by reference.

BACKGROUND OF THE INVENTION

Field of the Invention

The present disclosure relates to golf club shafts.

Description of the Related Art

As disclosed in JPH04-156870A (U.S. Pat. No. 5,242,721A) and JP2000-153009A (U.S. Pat. No. 6,533,677B1), there has been known an anisotropic shaft in which bend of the shaft involves twist of the shaft.

SUMMARY OF THE INVENTION

The inventor of the present application has found that a shaft having anisotropy is likely to cause a strange feeling to the user when swung.

The present disclosure provides an improved golf club shaft that has anisotropy.

According to one aspect, a golf club shaft includes a tip end, a butt end, a first anisotropic portion that is twisted in a first direction in conjunction with a bending of the golf club shaft at a circumferential bending position, and a second anisotropic portion that is twisted in a second direction in conjunction with the bending. The second anisotropic portion is located on a tip end side relative to the first anisotropic portion. The second direction is opposite to the first direction.

DESCRIPTION OF THE PREFERRED EMBODIMENTS

[Findings Serving as a Basis of the Present Disclosure]

In a golf club, the center of gravity of the head is located off a center line of the shaft. Because of such a difference in position between the center of gravity of the head and the center line of the shaft, golf players using a normal shaft feel a moderate bend and twist at turn in swinging. The turn means a moment of transition from backswing to downswing.

Meanwhile, an anisotropic shaft has a property in which bending involves twisting (bend-twist coupling property). For this reason, feel at turn of the anisotropic shaft is different from that of a normal shaft. The turn causes a large bending to a shaft, and in the case of using an anisotropic shaft, the bending involves twisting. As a result, feel at turn of this shaft is different from that of a normal shaft. Some users of the anisotropic shaft cannot feel the above-described moderate bend and twist, and on the contrary some users of the anisotropic shaft feel excessively large bend and twist. These generate a gap between an imagined club behavior and an actual club behavior. Because of the gap, those users might unconsciously turn their hands strongly or weakly. In addition, the gap makes difficult to find a right timing for swinging. These result in a missed shot.

The present disclosure is based on these findings and relates to an improved shaft that has anisotropy.

The following will describe embodiments in detail with reference to the drawings. In the present application, an axial direction means a direction of a center line of a shaft. In the present application, a circumferential direction means a circumferential direction of the shaft. Some following descriptions are based on the assumption that the golf player is right-handed. Therefore, those descriptions should be appropriately translated so as to be suited to left-handed golf players, as necessary.

Figure 1:
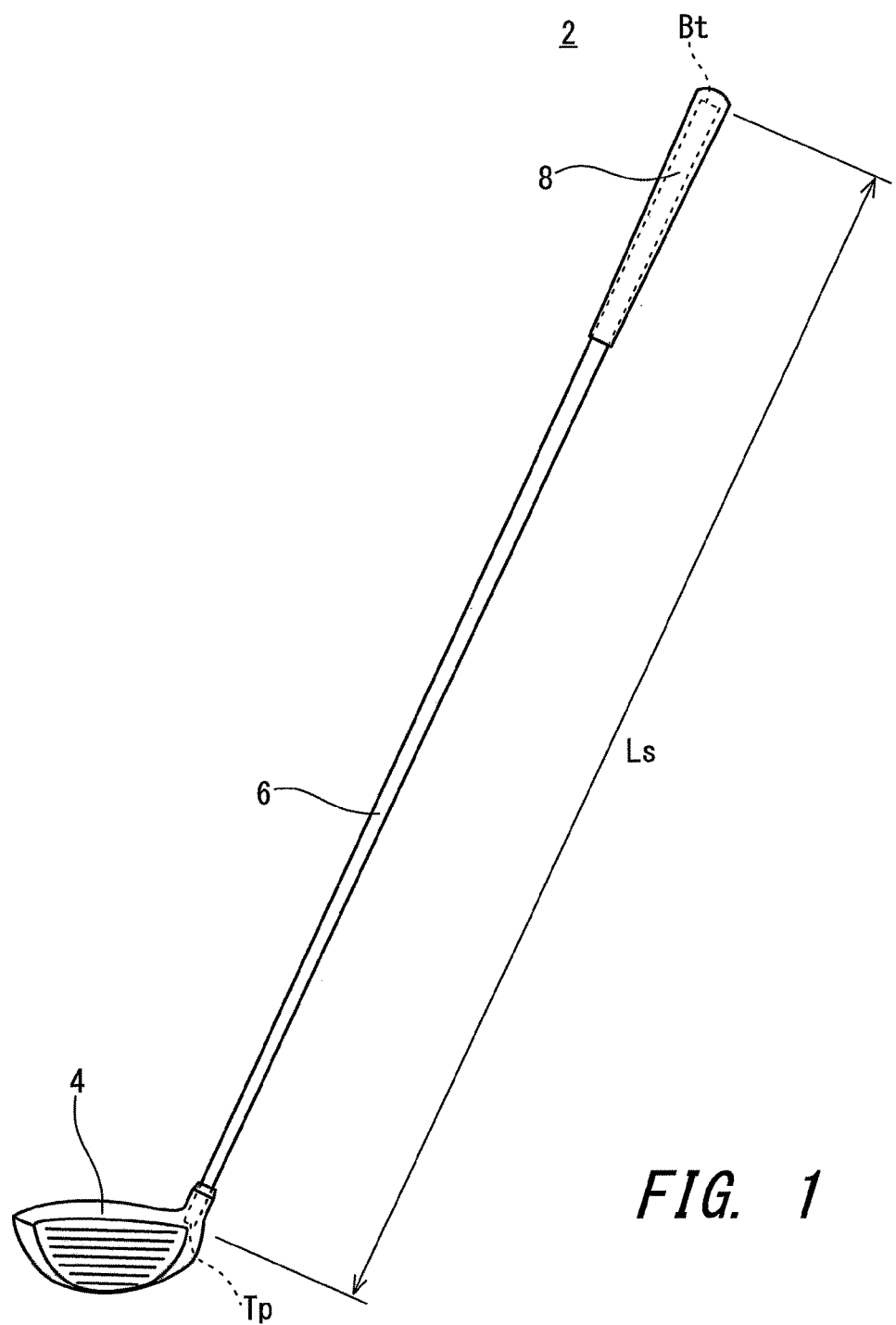
FIG. 1 shows a golf club that includes a shaft according to a first embodiment.

FIG. 1 shows a golf club 2 including a shaft 6 according to a first embodiment. The club 2 includes a head 4, the shaft 6, and a grip 8. The head 4 is attached to a tip end portion of the shaft 6. The grip 8 is attached to a butt end portion of the shaft 6. A double-pointed arrow Ls shows the length of the shaft 6.

Figure 2:
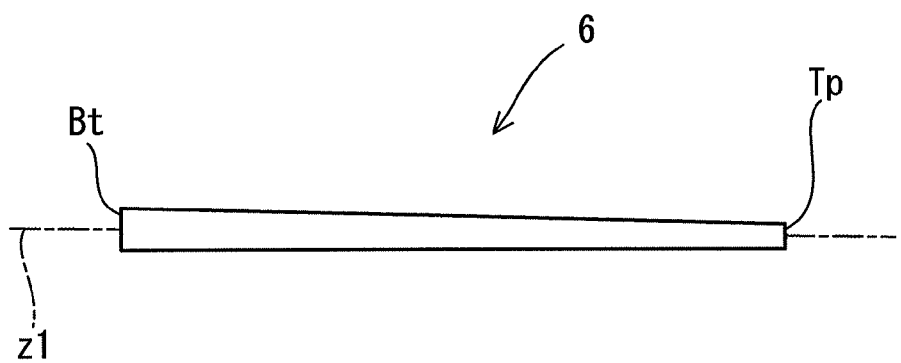
FIG. 2 shows the shaft according to the first embodiment.

FIG. 2 shows the shaft 6. The shaft 6 includes a tip end Tp and a butt end Bt. The shaft 6 includes a tapered portion having an outer diameter that decreases toward the tip end Tp from the butt end Bt. The shaft 6 is a tubular body. The shaft 6 has a center line z1.

Figure 3:
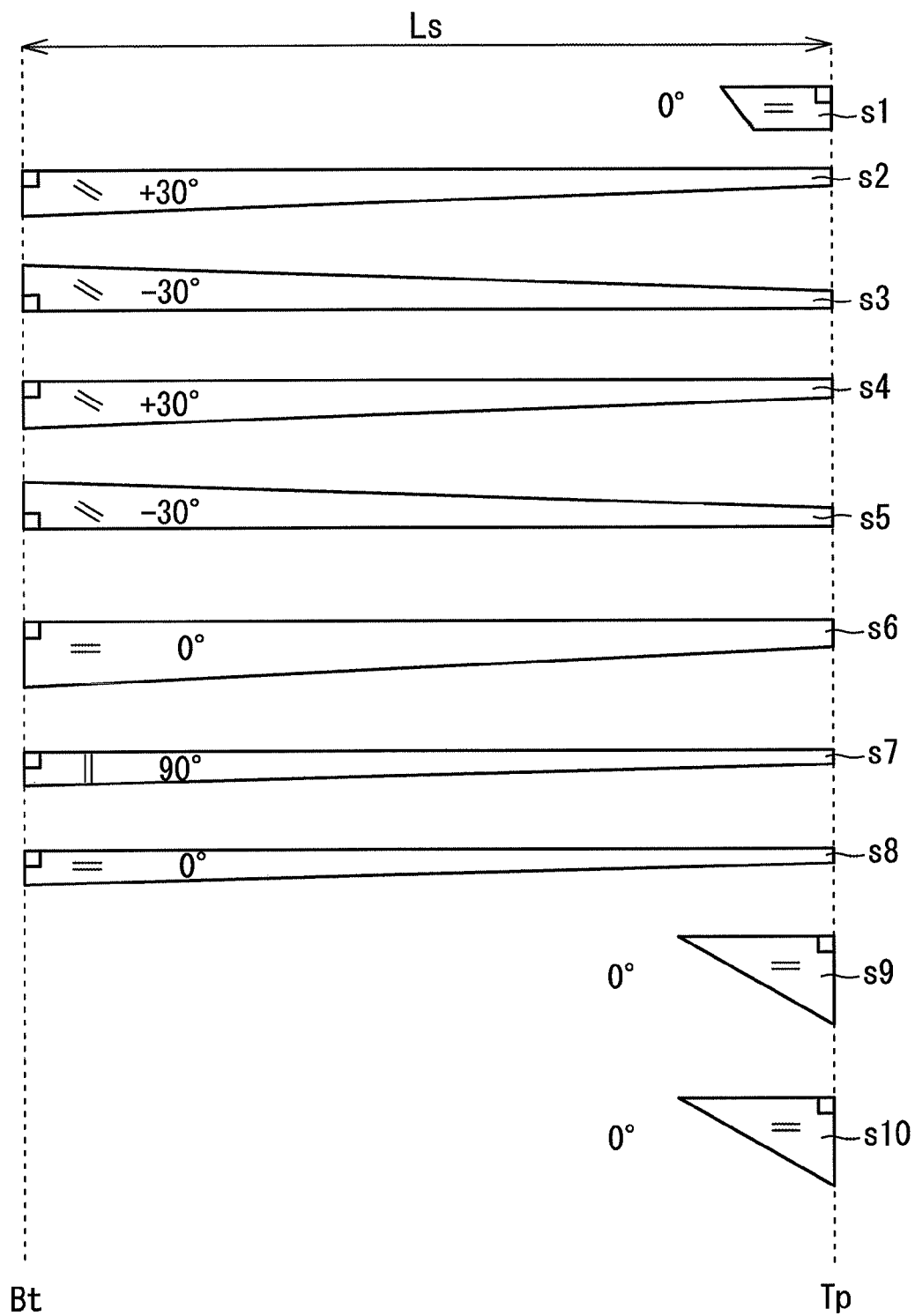
FIG. 3 is a developed view showing a laminated constitution of the shaft in FIG. 2.

FIG. 3 is a developed view showing a laminated constitution of the shaft 6.

The shaft 6 is manufactured by a sheet-winding method. In a prepreg sheet, a matrix resin is in a semi-cured state. The shaft 6 is obtained by winding and curing the prepreg sheet.

An epoxy resin, a thermosetting resin other than the epoxy resin, or a thermoplastic resin, etc. can be used for the matrix resin of the prepreg sheet. From the standpoint of shaft strength, the matrix resin is preferably the epoxy resin.

The shaft 6 is constituted by a plurality of sheets. The shaft 6 is constituted by 10 sheets of a first sheet s1 to a tenth sheet s10. The developed view shows the sheets constituting the shaft in order from the innermost sheet in the radial direction of the shaft. The sheets are wound in order from the sheet located on the uppermost side in the developed view. In the developed view, the horizontal direction of the figure coincides with the axial direction of the shaft. In the developed view, the right side of the figure is the tip end Tp side of the shaft. In the developed view, the left side of the figure is the butt end Bt side of the shaft.

The developed view shows not only the winding order of the sheets but also the disposal of each of the sheets in the axial direction of the shaft. For example, in FIG. 3, an end of the first sheet s1 is located at the tip end Tp.

The term "layer" and the term "sheet" are used in the present application. The "layer" is a term for after being wound. Meanwhile, the "sheet" is a term for before being wound. The "layer" is formed by winding the "sheet". That is, the wound "sheet" forms the "layer". In the present application, the same symbol is used in the layer and the sheet. For example, a layer formed by the sheet s1 is a layer s1.

The shaft 6 includes a straight layer, a bias layer, and a hoop layer. An orientation angle of fiber is described for each of the sheets in the developed view of the present application. The orientation angle is an angle relative to the axial direction the shaft.

Sheets described as "0°" form the straight layers. The sheet forming the straight layer is also referred to as a straight sheet. The straight layer has an absolute angle of less than or equal to 10 degrees. The absolute angle means an absolute value of the orientation angle. For example, "the absolute angle is less than or equal to 10 degrees" means that "the orientation angle is −10 degrees or greater and +10 degrees or less".

Sheets described as "+30°" or "−30°" form the bias layers. The bias layer has an absolute angle of preferably greater than or equal to 15 degrees, and more preferably greater than or equal to 20 degrees. The absolute angle of the bias layer is preferably less than or equal to 75 degrees, and more preferably less than or equal to 70 degrees. From the standpoint of creation of anisotropy, the absolute angle of the bias layer is particularly preferably greater than or equal to 20 degrees and less than or equal to 45 degrees.

As described later, the bias sheet is wound while a winding start edge thereof is inclined relative to the axial direction. Therefore, the absolute angle of the bias layer is actually slightly different from the angle (30°) relative to the winding start edge of the sheet.

The plus (+) and minus (−) in the orientation angle show that the fibers of respective bias sheets are inclined in opposite directions to each other. The fiber of the sheet s2 and the fiber of the sheet s3 are oriented in opposite directions to each other. The fiber of the sheet s4 and the fiber of the sheet s5 are oriented in opposite directions to each other.

In FIG. 3, the inclination direction of the fiber of the sheet s3 is equal to the inclination direction of the fiber of the sheet s2. However, the sheet s3 is reversed, and applied on the sheet s2. As a result, the inclination direction of the sheet s2 and the inclination direction of the sheet s3 are opposite to each other. In view of this point, in the embodiment of FIG. 3, the orientation angle of the sheet s2 is described as +30° and the orientation angle of the sheet s3 is described as −30°.

A sheet described as "90°" forms the hoop layer. The hoop layer has a fiber orientation angle of −90 degrees or greater and −80 degrees or less, or 80 degrees or greater and 90 degrees or less. In other words, the hoop layer has an absolute angle of 80 degrees or greater and 90 degrees or less.

The number of plies (number of windings, hereinafter referred to as ply number) of one sheet is not limited. For example, if the ply number of a sheet is 1, the sheet is wound by one round. For example, if the ply number of a sheet is 2, the sheet is wound by two rounds. For example, if the ply number of a sheet is 1.5, the sheet is wound by 1.5 rounds. When the ply number of the sheet is 1.5, the sheet forms one layer at the location in the circumferential direction of 0 to 180 degrees, and forms two layers at the location in the circumferential direction of 180 to 360 degrees.

Although not shown in the drawings, the prepreg sheet before being used is sandwiched between cover sheets. The cover sheets are usually a mold release paper and a resin film. The prepreg sheet before being used is sandwiched between the mold release paper and the resin film. The mold release paper is applied on one surface of the prepreg sheet, and the resin film is applied on the other surface of the prepreg sheet. Hereinafter, the surface on which the mold release paper is applied is also referred to as "a surface of a mold release paper side", and the surface on which the resin film is applied is also referred to as "a surface of a film side".

In the developed view of FIG. 3, the surface of the film side is the front side. That is, in FIG. 3, the front side of the figure is the surface of the film side, and the back side of the figure is the surface of the mold release paper side.

In order to wind the prepreg sheet, the resin film is first peeled. The surface of the film side is exposed by peeling the resin film. The exposed surface has tacking property (tackiness). The tacking property is caused by the matrix resin. That is, since the matrix resin is in a semi-cured state, the tackiness is developed. The edge part of the exposed surface of the film side is applied to an object to be wound. The edge part can be smoothly applied by the tackiness of the matrix resin. The object to be wound is a mandrel or a wound article obtained by winding other prepreg sheet(s) around the mandrel. Next, the mold release paper is peeled. Next, the object to be wound is rotated to wind the prepreg sheet around the object.

In the embodiment of FIG. 3, some of the sheets are used as a united sheet. The united sheet is formed by stacking two or more sheets. The bias sheets s2, s3, s4, and s5 are wound in a state of the united sheets.

In the present application, a layer substantially wholly disposed in the axial direction of the shaft is referred to as a full length layer. In the present application, a sheet substantially wholly disposed in the axial direction of the shaft is referred to as a full length sheet. The wound full length sheet forms the full length layer.

In the present application, a layer partially disposed in the axial direction of the shaft is referred to as a partial layer. In the present application, a sheet partially disposed in the axial direction of the shaft is referred to as a partial sheet. The wound partial sheet forms the partial layer. The length in the axial direction of the partial sheet is shorter than that of the full length sheet. Preferably, the length in the axial direction of the partial sheet is less than or equal to half the full length of the shaft.

In the present application, the full length layer that is the straight layer is referred to as a full length straight layer. In the embodiment of FIG. 3, the full length straight layers are a layer s6 and a layer s8.

In the present application, the full length layer that is the bias layer is referred to as a full length bias layer. In the embodiment of FIG. 3, the full length bias layers are a layer s2, a layer s3, a layer s4 and a layer s5.

In the present application, the full length layer that is the hoop layer is referred to as a full length hoop layer. In the embodiment of FIG. 3, the full length hoop layer is a layer s7.

In the present application, the partial layer that is the straight layer is referred to as a partial straight layer. In the embodiment of FIG. 3, the partial straight layers are a layer s1, a layer s9, and a layer s10.

The term "tip partial layer" is used in the present application. A distance in the axial direction between the tip partial layer (tip partial sheet) and the tip end Tp is preferably less than or equal to 40 mm, more preferably less than or equal to 30 mm, still more preferably less than or equal to 20 mm, and yet still more preferably 0 mm. In the present embodiment, the distance is 0 mm in all the tip partial layers.

Examples of the tip partial layer include a tip partial straight layer. In the embodiment of FIG. 3, the tip partial straight layers are the layer s1, the layer s9, and the layer s10.

Hereinafter, a manufacturing process of the shaft 6 will be schematically described.

[Outline of Manufacturing Process of Shaft]

(1) Cutting Process

The prepreg sheet is cut into a desired shape in the cutting process. Each of the sheets shown in FIG. 3 is cut out by the process.

The cutting may be performed by a cutting machine. The cutting may be manually performed. In the manual case, for example, a cutter knife is used.

(2) Stacking Process

In the stacking process, the united sheet described above is produced.

(3) Winding Process

A mandrel is prepared in the winding process. A typical mandrel is made of a metal. A mold release agent is applied to the mandrel. Furthermore, a resin having tackiness is applied to the mandrel. The resin is also referred to as a tacking resin. The cut sheet is wound around the mandrel. The tacking resin facilitates the application of the end portion of the sheet to the mandrel.

The sheets are wound in order described in the developed view. The sheet located on a more upper side in the developed view is earlier wound. The sheets to be stacked are wound in the state of the united sheet.

First, ends of each sheet are applied to the object to be wound at a predetermined end application position. Next, the object to be wound is rolled. The winding may be performed by a manual operation or a machine. The machine is referred to as a rolling machine. A wound body is obtained by winding all the sheets.

(4) Tape Wrapping Process

A tape is wrapped around the outer peripheral surface of the wound body in the tape wrapping process. The tape is also referred to as a wrapping tape. The tape is wrapped while tension is applied to the tape. A pressure is applied to the wound body by the wrapping tape. The pressure reduces voids.

(5) Curing Process

In the curing process, the wound body after performing the tape wrapping is heated. The heating cures the matrix resin. In the curing process, the matrix resin fluidizes temporarily. The fluidization of the matrix resin can discharge air between the sheets or in the sheet. The pressure (fastening force) of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The process of removing the wrapping tape is preferably performed after the process of extracting the mandrel from the standpoint of improving the efficiency of the process of removing the wrapping tape.

(7) Process of Cutting Both Ends

Both the end portions of the cured laminate are cut in the process. The cutting flattens the end face of the tip end Tp and the end face of the butt end Bt.

(8) Polishing Process

The surface of the cured laminate is polished in the process. Spiral unevenness is present on the surface of the cured laminate. The unevenness is the trace of the wrapping tape. The polishing extinguishes the unevenness to smooth the surface of the cured laminate. Preferably, whole polishing and tip partial polishing are conducted in the polishing process.

(9) Coating Process

The cured laminate after the polishing process is subjected to coating.

The stacking process is a process of stacking sheets respective fibers of which are inclined in opposite directions to each other. In the shaft 6, the sheet s2 and the sheet s3 are stacked. In addition, the sheet s4 and the sheet s5 are stacked.

Figure 4:
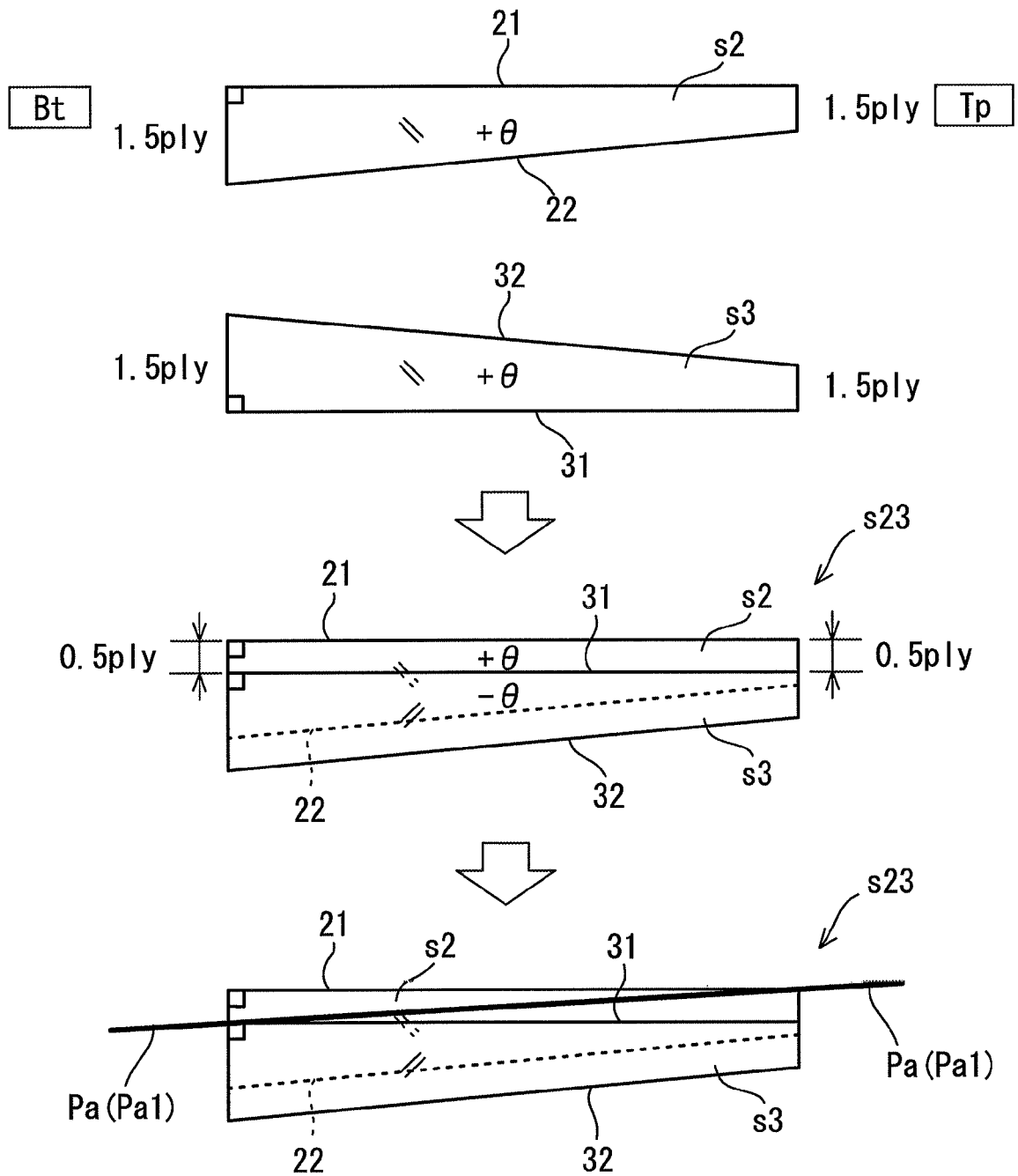
FIG. 4 illustrates a first united sheet and an end application position of the first united sheet.

FIG. 4 shows the process of stacking the sheet s2 and the sheet s3.

The ply number of the sheet s2 is 1.5. That is, the sheet s2 has a width for being wound 1.5 rounds. The sheet s2 includes a winding start edge 21 and a winding finish edge 22. The sheet s2 has a fiber orientation angle of +θ° relative to the winding start edge 21. In the present embodiment, θ is 30.

The ply number of the sheet s3 is 1.5. The sheet s3 includes a winding start edge 31 and a winding finish edge 32. The sheet s3 has a fiber orientation angle of +θ° relative to the winding start edge 31.

The sheet s3 is stacked on the sheet s2 to produce a united sheet s23. The sheet s3 is reversed and applied on the sheet s2. As a result, the fiber of the sheet s2 and the fiber of the sheet s3 are inclined in opposite directions to each other.

In the united sheet s23, the sheet s3 is displaced by a width of 0.5 plies relative to the sheet 2 and stacked on the sheet 2. That is, the relative displacement between the winding start edge 21 and the winding start edge 31 is 0.5 plies. The 0.5 plies mean half a round, that is 180°.

Figure 5:
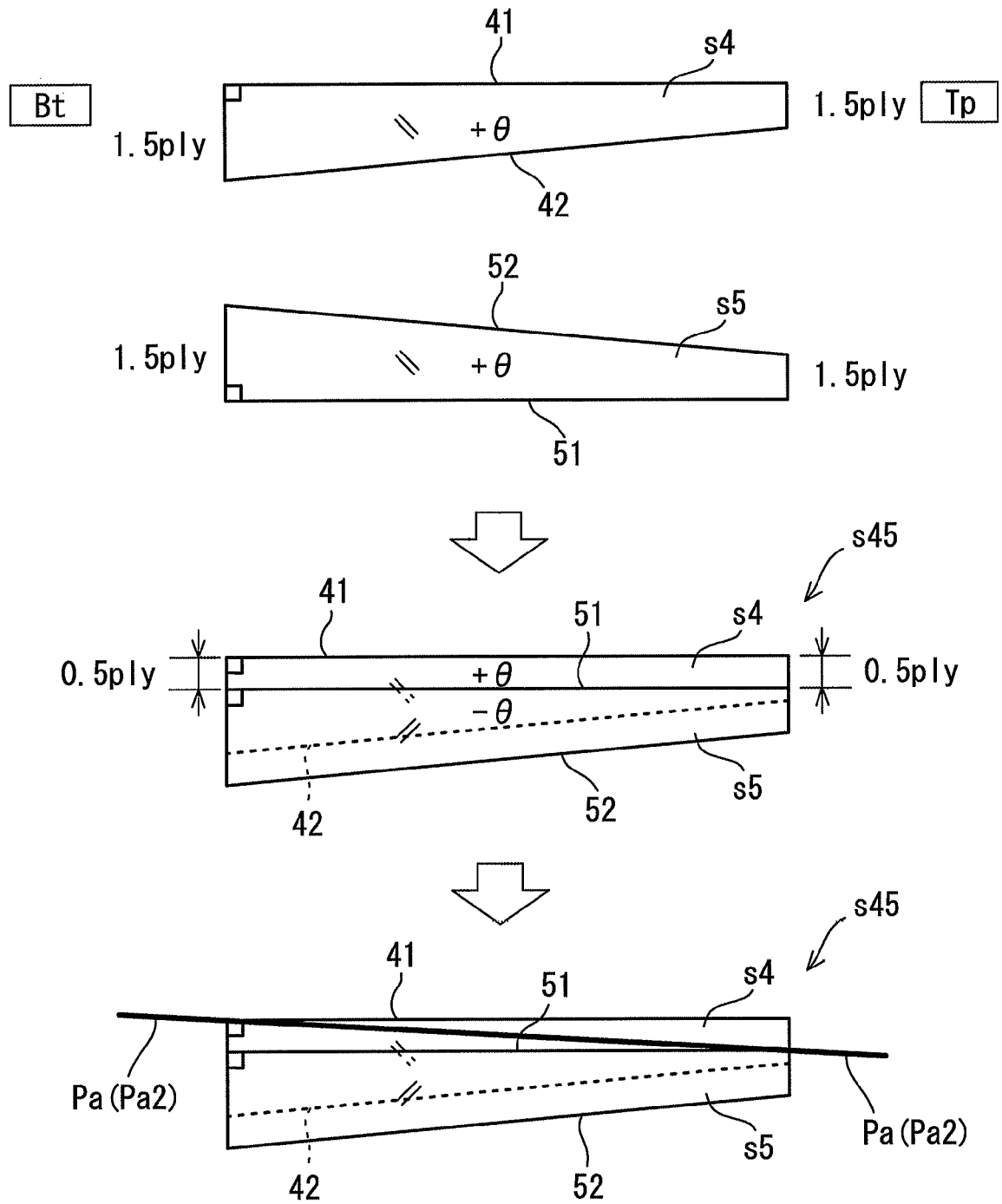
FIG. 5 illustrates a second united sheet and an end application position of the second united sheet.

FIG. 5 shows the process of stacking the sheet s4 and the sheet s5.

The ply number of the sheet s4 is 1.5. The sheet s4 includes a winding start edge 41 and a winding finish edge 42. The sheet s4 has a fiber orientation angle of +θ° relative to the winding start edge 41.

The ply number of the sheet s5 is 1.5. The sheet s5 includes a winding start edge 51 and a winding finish edge 52. The sheet s5 has a fiber orientation angle of +θ° relative to the winding start edge 51.

The sheet s5 is stacked on the sheet s4 to produce a united sheet s45. The sheet s5 is reversed and applied on the sheet s4. As a result, the fiber of the sheet s4 and the fiber of the sheet s5 are inclined in opposite directions to each other.

In the united sheet s45, the sheet s4 is displaced by a width of 0.5 plies relative to the sheet 5 and stacked on the sheet 5. That is, the relative displacement between the winding start edge 41 and the winding start edge 51 is 0.5 plies. The 0.5 plies mean half a round, that is 180°.

The united sheet s23 and the united sheet s45 are subjected to the winding process.

In FIG. 4, a bold line depicted on the united sheet s23 indicates an end application position Pa. Ends of the sheet are applied at the end application position Pa in the winding process. The end application position Pa is made parallel to the axial direction. In the present embodiment, the end application position Pa is not equal to the winding start edge 21. The end application position Pa is inclined relative to the winding start edge 21. At the tip end Tp, the end application position Pa coincides with the winding start edge 21. On the other hand, at the butt end Bt, the end application position Pa is displaced by 0.5 plies (180°) relative to the winding start edge 21. As a result, the end application position Pa at the tip end Tp is displaced in the circumferential direction by 0.5 plies) (180° relative to the end application position Pa at the butt end Bt. The amount of relative displacement between the winding start edge 21 and the end application position Pa is increased toward the butt end Bt. In the united sheet s23 after being wound, the winding start edge 21 has a helical shape. Similarly, the winding finish edge 22 also has a helical shape. Similarly, the winding start edge 31 and the winding finish edge 32 also each have a helical shape.

In FIG. 5, a bold line depicted on the united sheet s45 indicates an end application position Pa. Ends of the sheet are applied at the end application position Pa in the winding process. The end application position Pa is made parallel to the axial direction. The end application position Pa is not equal to the winding start edge 41. The end application position Pa is inclined relative to the winding start edge 41. At the tip end Tp, the end application position Pa is displaced by 0.5 plies (180°) relative to the winding start edge 41. On the other hand, the end application position Pa coincides with the winding start edge 41 at the butt end Bt. As a result, the end application position Pa at the tip end Tp is displaced in the circumferential direction by 0.5 plies (180°) relative to the end application position Pa at the butt end Bt. The amount of relative displacement between the winding start edge 41 and the end application position Pa is increased toward the tip end Tp. In the united sheet s45 after being wound, the winding start edge 41 has a helical shape. Similarly, the winding finish edge 42 also has a helical shape. Similarly, the winding start edge 51 and the winding finish edge 52 also each have a helical shape.

In the winding process, winding of the united sheet s23 is followed by winding of the united sheet s45. The united sheet S45 is wound while being displaced in the circumferential direction relative to the united sheet s23. The position in the circumferential direction (hereinafter referred to as circumferential position) of the end application position Pa of the united sheet s45 is different by 180° relative to the circumferential position of the end application position Pa of the united sheet s23.

The shaft 6 is obtained by the above described processes.

The shaft 6 includes two regions that are twisted in opposite directions to each other when the shaft 6 is bent in a direction.

[Circumferential Bending Position]

A circumferential bending position is defined in the present application. The circumferential bending position means a circumferential position at the outside of bending. In other words, the circumferential bending position means a circumferential position at the external side of bending. For example, when a butt end portion of a shaft is fixed so that the shaft is horizontal and the shaft is bent by hanging a weight at a tip end portion of the shaft, a vertically uppermost circumferential position on the surface of the shaft is the circumferential bending position. The circumferential bending position has a range of 0° to 360°.

[Offsetting in Anisotropies]

Figure 6:
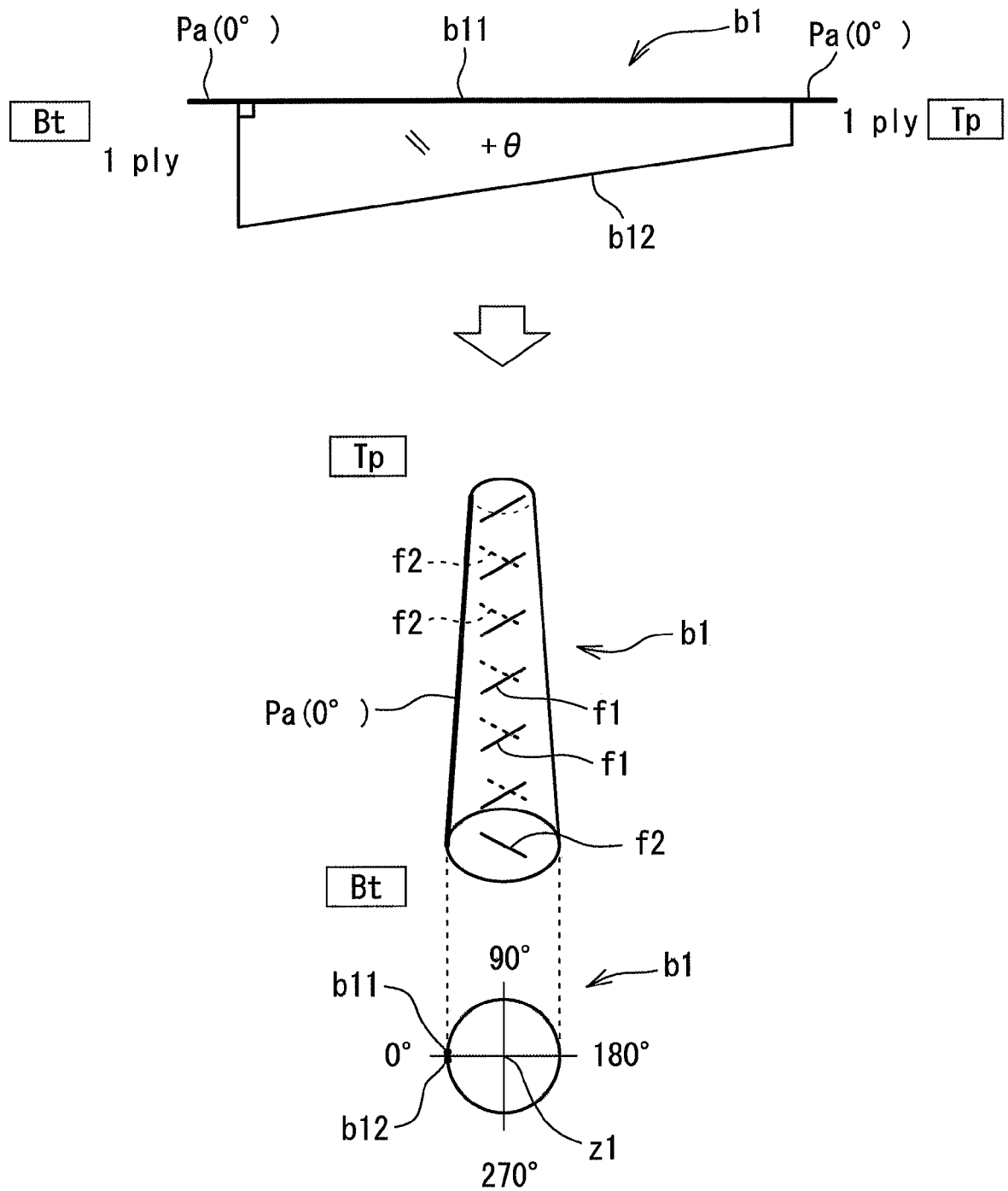
FIG. 6 illustrates a structure in which anisotropies are offset against each other in a 1-ply bias layer.

First, a structure that does not create anisotropy is explained. FIG. 6 shows a bias sheet b1. The bias sheet b1 includes a winding start edge b11 and a winding finish edge b12. The ply number of the bias sheet b1 is 1. The winding start edge b11 is set as the end application position Pa to wind the bias sheet b1. The end application position Pa is parallel to the axial direction. This winding forms a layer b1. FIG. 6 shows a perspective view of the layer b1 solely extracted from the shaft. The winding makes the layer b1 a tubular body as a whole. When the circumferential position of the end application position Pa is defined as 0°, the winding start edge b11 of the layer b1 is located at 0°. Since the ply number of the bias sheet b1 is 1, the winding finish edge b12 is also located at 0° (360°).

In this case, the circumferential position of 90° is located on the upper side, and the circumferential position of 270° is located on the lower side. That is, the circumferential bending position is located at 90°. The fiber orientation angle of the layer b1 is +θ° relative to the axial direction at any circumferential position. Anisotropies are offset against each other in this structure. As shown in the perspective view of FIG. 6, when the layer b1 which is the tubular body is viewed from the upper side, the inclination of a fiber f1 on the upper side is inverted as compared with the inclination of a fiber f2 on the lower side. This inverted relationship is satisfied at all circumferential positions. Therefore, anisotropies are offset against each other at all the circumferential bending positions. The layer b1 does not include an anisotropy creation portion.

[Anisotropy Creation Portion]

Figure 7:
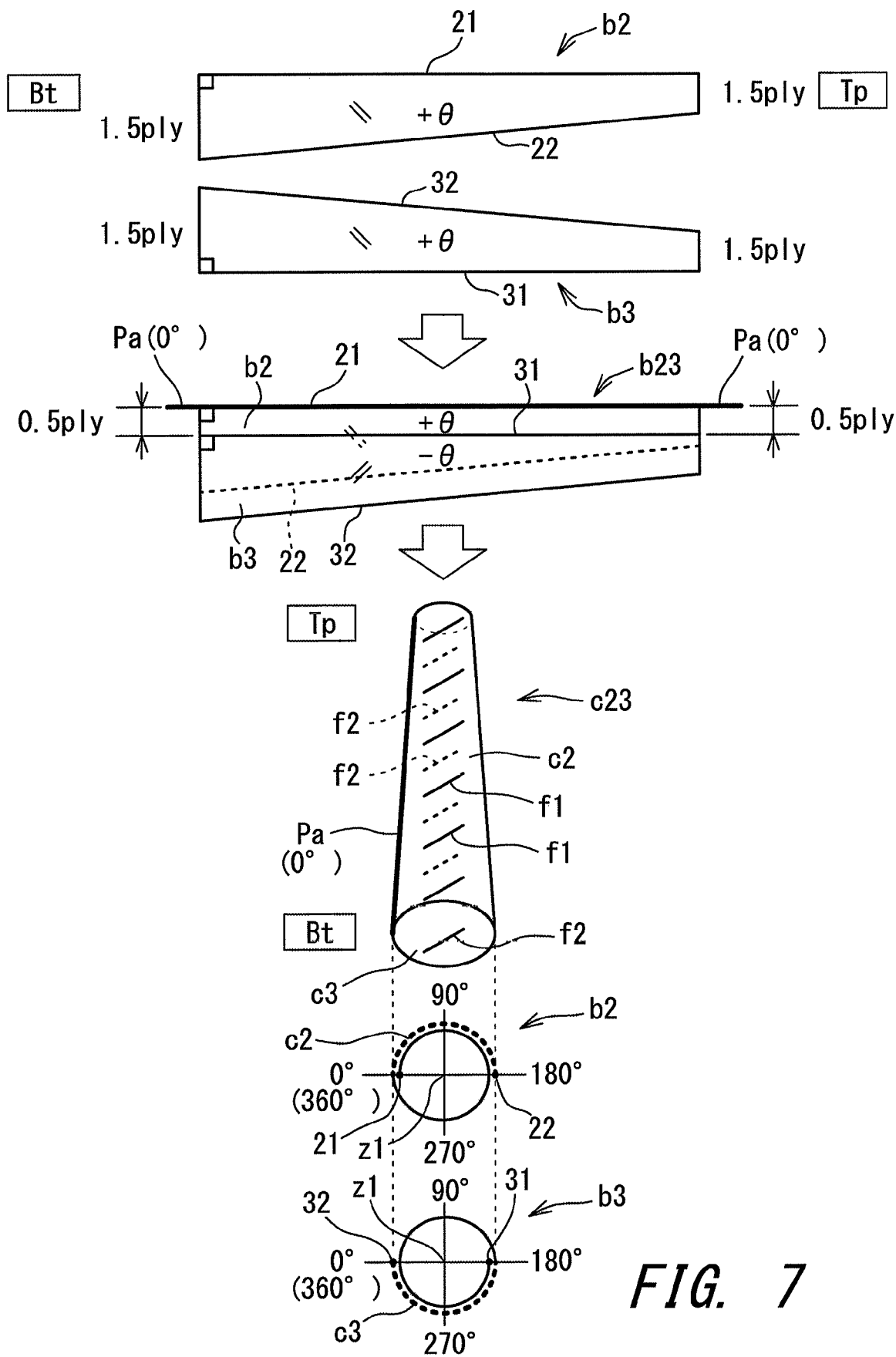
FIG. 7 illustrates a structure in which anisotropy is created by a 1.5-ply bias layer.

Next, a structure that includes an anisotropy creation portion is explained. FIG. 7 shows a bias sheet b2 having a ply number of 1.5 and a bias sheet b3 having a ply number of 1.5. The bias sheet b2 includes a winding start edge 21 and a winding finish edge 22. The bias sheet b3 includes a winding start edge 31 and a winding finish edge 32.

Next, the bias sheet b2 and the bias sheet b3 are stacked to obtain a united sheet b23. In the united sheet b23, the bias sheet b3 is displaced by 0.5 plies (180°) relative to the bias sheet b2. The relative displacement between the winding start edge 21 and the winding start edge 31 is 0.5 plies (180°). The structure of the united sheet b23 is the same as that of the united sheet s23 described above.

The winding start edge 21 is set as the end application position Pa to wind the united sheet b23. The end application position Pa is parallel to the axial direction. This winding forms a layer b23. The layer b23 is a tubular body as a whole. The layer b23 is constituted by the bias sheet b2 wound 1.5 rounds and the bias sheet b3 wound 1.5 rounds. When the circumferential position of the end application position Pa is defined as 0°, the winding start edge 21 is located at 0°, and the winding start edge 31 is located at 180°.

In the bias sheet b2, anisotropies in a region of 1 ply out of the 1.5 plies are offset against each other. Anisotropy in a region of the remaining 0.5 plies is not offset. The region of the remaining 0.5 plies is located right opposite to a bending at the circumferential bending position of 90°. Therefore, the whole region of the remaining 0.5 plies is an anisotropy creation portion c2. The anisotropy creation portion c2 is shown by a bold dashed line.

Also in the bias sheet b3, anisotropies in a region of 1 ply out of the 1.5 plies are offset against each other. Anisotropy in a region of the remaining 0.5 plies is not offset. The region of the remaining 0.5 plies is an anisotropy creation portion c3 that is shown by a bold dashed line.

The perspective view in FIG. 7 shows the anisotropy creation portion c2 and the anisotropy creation portion c3, which are extracted from the shaft. The anisotropy creation portion c2 has a semi-cylindrical shape as a whole. The anisotropy creation portion c3 also has a semi-cylindrical shape as a whole. In addition, the circumferential location of the anisotropy creation portion c2 is different by 180° relative to the circumferential location of the anisotropy creation portion c3. The anisotropy creation portion c2 extends in the circumferential direction from 0° to 180°. The anisotropy creation portion c3 extends in the circumferential direction from 180° to 360°. As a result, the anisotropy creation portion c2 and the anisotropy creation portion c3 constitute a tubular body c23. The perspective view of FIG. 7 shows the tubular body c23.

The anisotropy creation portion c2 comes from the bias sheet b2, and the anisotropy creation portion c3 comes from the bias sheet b3. Therefore, the fiber of the anisotropy creation portion c2 and the fiber of the anisotropy creation portion c3 are oriented in opposite directions to each other. In this case, the anisotropy of the anisotropy creation portion c2 and the anisotropy of the anisotropy creation portion c3 are not offset against each other. That is, in this case, in the layer c23 which is the tubular body, the inclination direction of a fiber f1 on the upper side is the same as the inclination direction of a fiber f2 on the lower side when viewed from the upper side (see the perspective view of FIG. 7). The anisotropy of the anisotropy creation portion c2 and the anisotropy of the anisotropy creation portion c3 are not offset against each other. On the contrary, the anisotropy of the anisotropy creation portion c2 and the anisotropy of the anisotropy creation portion c3 are summed up to increase the whole anisotropy.

[Anisotropy Creation Portion Varying Depending on its Position in the Axial Direction (Hereinafter Referred to as Axial-Direction Position)]

Figure 8:
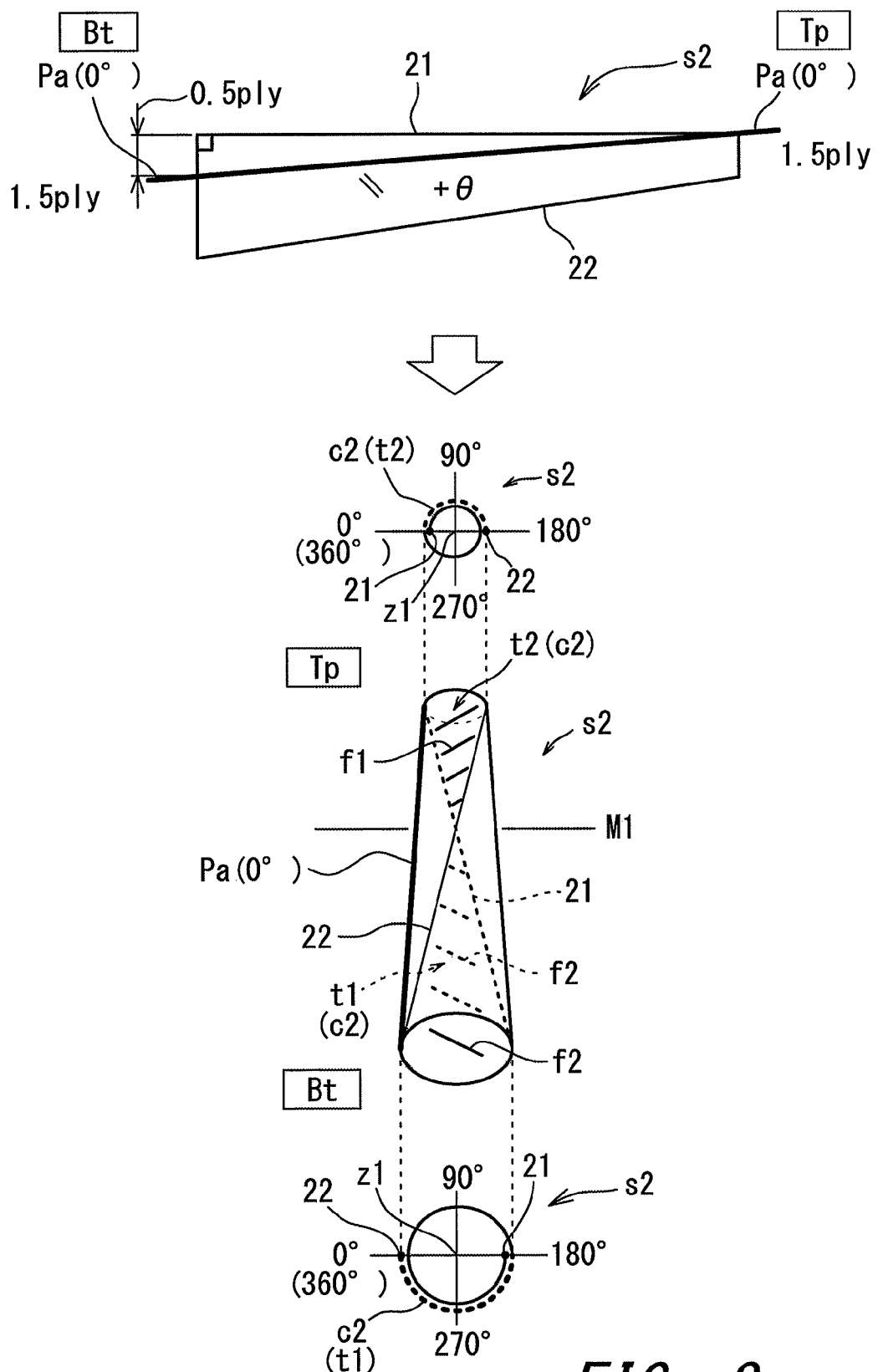
FIG. 8 illustrates a structure in which anisotropies are created inversely against each other by inclination of an end application position.

Next, a case in which the end application position Pa of the bias sheet s2 is inclined is considered. FIG. 8 shows the same sheet s2 as shown in FIG. 4. The sheet s2 includes the winding start edge 21 and the winding finish edge 22. When the bias sheet s2 is wound, the end application position Pa is inclined relative to the winding start edge 21. At the tip end Tp, the end application position Pa coincides with the winding start edge 21. At the butt end Bt, the end application position Pa is displaced by 0.5 plies (180°) relative to the winding start edge 21. The relationship between the bias sheet s2 and the end application position Pa is the same as in FIG. 4.

The end application position Pa is located at 0° to wind the bias sheet s2. The perspective view in FIG. 8 shows the bias sheet s2 that has been wound to form a tubular body. The winding start edge 21 is inclined relative to the axial direction because of the inclined end application position Pa. The circumferential position of the winding start edge 21 changes by 180° while the axial-direction position of the winding start edge 21 changes from the tip end Tp to the butt end Bt. The winding start edge 21 has a helical shape as a whole. The winding finish edge 22 is also inclined relative to the axial direction. The circumferential position of the winding finish edge 22 changes by 180° while the axial-direction position of the winding finish edge 22 changes from the tip end Tp to the butt end Bt. The winding finish edge 22 also has a helical shape as a whole. The circumferential position of the winding finish edge 22 is different by 180° from the circumferential position of the winding start edge 21 at any axial-direction positions. The perspective view of FIG. 8 shows the winding start edge 21 and the winding finish edge 22 which have respective helical shapes by using approximated straight lines.

Similar to the case of FIG. 7, also in the embodiment of FIG. 8, 0.5 plies out of the 1.5 plies can be the anisotropy creation portion c2. However, the circumferential location of the 0.5 plies changes depending on its axial-direction position. As shown in FIG. 8, at the butt end Bt, the 0.5 plies extend in the circumferential direction from 180° to 360°. On the other hand, at the tip end Tp, the 0.5 plies extend in the circumferential direction from 0° to 180°. The circumferential location of the 0.5 plies changes by 180° while the axial-direction position of the 0.5 plies changes from the butt end Bt to the tip end Tp. The circumferential location of the 0.5 plies gradually changes while the axial-direction position of the 0.5 plies changes from the butt end Bt to the tip end Tp.

When the circumferential bending position is located at 90°, anisotropies in the single 0.5 plies are partially offset against each other at any axial-direction positions except at the butt end Bt and the tip end Tp. This is because, of the 0.5 plies, a portion on the upper side is opposed to a portion on the lower side. For this reason, the anisotropy creation portion c2 is decreased toward a middle position M1 in a region between the butt end Bt and the middle position M1, is eliminated at the middle position M1, and is increased toward the tip end Tp in a region between the middle position M1 and the tip end Tp (see the perspective view of FIG. 8).

The circumferential location of the anisotropy creation portion c2 is changed at the middle position M1 from the upper side to the lower side. In the region between the butt end Bt and the middle position M1, the anisotropy creation portion c2 is located on the lower side. In the region between the middle position M1 and the tip end Tp, the anisotropy creation portion c2 is located on the upper side. As a result, the anisotropy creation portion c2 in the region between the middle position M1 and the butt end Bt constitutes a first twist layer t1, and the anisotropy creation portion c2 in the region between the middle position M1 and the tip end Tp constitutes a second twist layer t2. The first twist layer t1 creates a twist in a first direction in bending at the circumferential bending position of 90°. The second twist layer t2 creates a twist in a second direction in bending at the circumferential bending position of 90°. The first direction and the second direction are opposite to each other.

In the shaft 6, the united sheet s23 in which the sheet s2 and the sheet s3 are stacked is wound. In the whole axis direction position, the sheet s3 is displaced by 0.5 plies (180°) relative to the sheet s2. In addition, the inclination direction of the fiber of the sheet s3 is opposite to the inclination direction of the fiber of the sheet s2. This relationship is the same as the relationship between the sheet b1 and the sheet b2 in FIG. 7. Similar to the sheet b2 forming the anisotropy creation portion whose anisotropy is added to the anisotropy of the sheet b1, the sheet s3 also forms the anisotropy creation portion whose anisotropy is added to the anisotropy of the sheet s2. When viewed from the upper side, the shape of an anisotropy creation portion formed by the sheet s3 coincides with the anisotropy creation portion c2 formed by the sheet s2.

Figure 9:
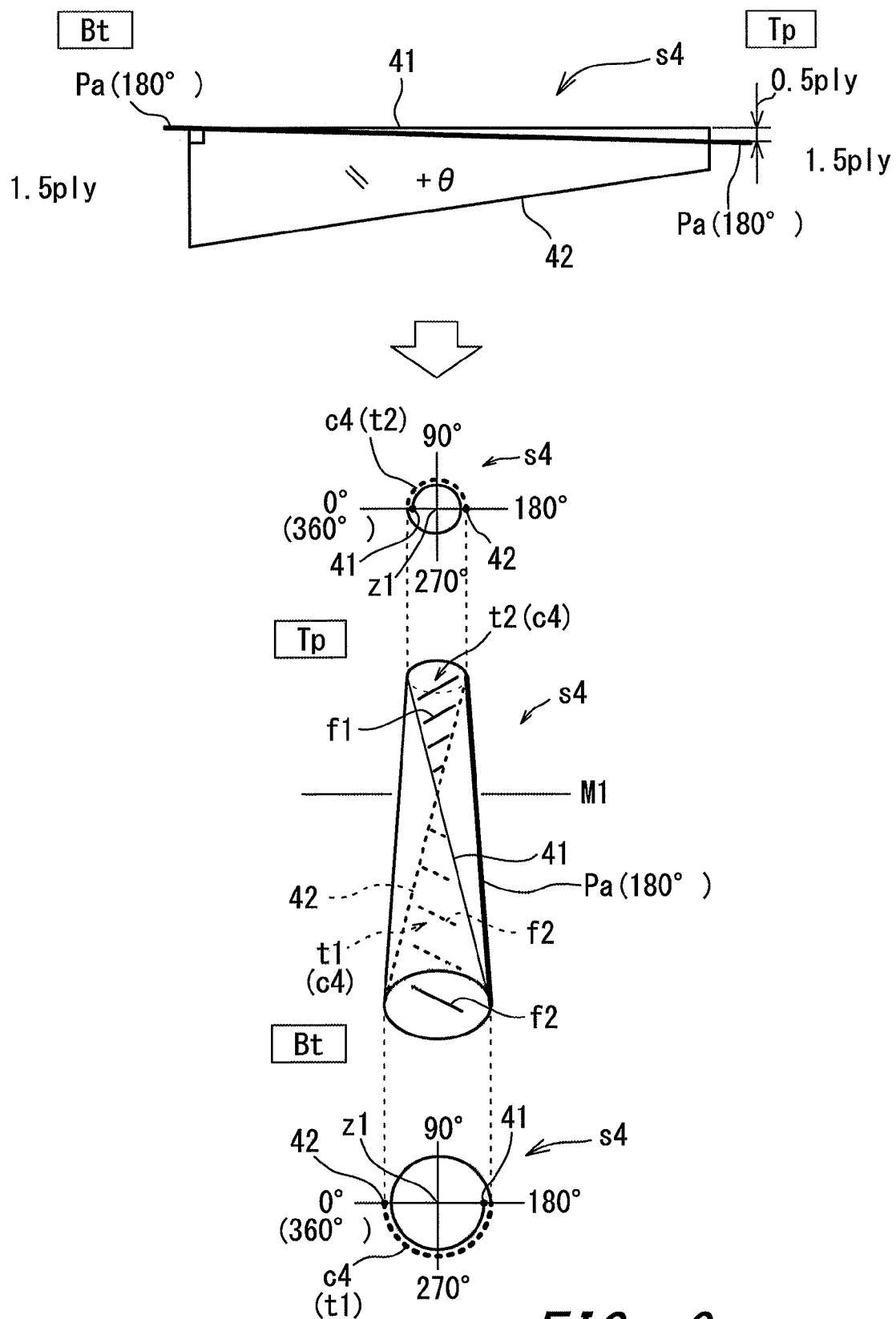
FIG. 9 illustrates a structure in which anisotropies are created inversely against each other by inclination of the end application position.

FIG. 9 shows the same sheet s4 as shown in FIG. 5. The sheet s4 includes the winding start edge 41 and the winding finish edge 42. When the bias sheet s4 is wound, the end application position Pa is inclined relative to the winding start edge 41. At the tip end Tp, the end application position Pa is displaced by 0.5 plies (180°) relative to the winding start edge 41. At the butt end Bt, the end application position Pa coincides with the winding start edge 41. The relationship between the bias sheet s4 and the end application position Pa is the same as that in FIG. 5.

The end application position Pa is located at 180° to wind the bias sheet s4. This bias sheet s4 is wound in the same state as the sheet s4 of the above-described shaft 6. The perspective view in FIG. 9 shows the bias sheet s4 that has been wound to form a tubular body. The winding start edge 41 is inclined relative to the axial direction because of the inclined end application position Pa. The circumferential position of the winding start edge 41 changes by 180° while the axial-direction position of the winding start edge 41 changes from the tip end Tp to the butt end Bt. For this reason, the winding start edge 41 has a helical shape as a whole. In addition, the winding finish edge 42 is also inclined relative to the axial direction. The circumferential position of the winding finish edge 42 changes by 180° while the axial-direction position of the winding finish edge 42 changes from the tip end Tp to the butt end Bt. The winding finish edge 42 also has a helical shape as a whole. The circumferential position of the winding finish edge 42 is different by 180° from the circumferential position of the winding start edge 41 at any axial-direction positions. The perspective view of FIG. 9 shows the winding start edge 41 and the winding finish edge 42 which have respective helical shapes by using approximated straight lines.

Similar to the case of FIG. 8, also in the embodiment of FIG. 9, the circumferential location of 0.5 plies out of the 1.5 plies changes by 180° while the axial-direction position of the 0.5 plies changes from the butt end Bt to the tip end Tp. The circumferential location of the 0.5 plies gradually changes while the axial-direction position of the 0.5 plies changes from the butt end Bt to the tip end Tp.

As with the sheet s2 in FIG. 8, anisotropies at axial-direction positions, except for at the butt end Bt and the tip end Tp, are partially offset against each other also in the sheet s4. The anisotropy creation portion c4 is gradually decreased toward the middle position M1 in the region between the butt end Bt and the middle position M1, is eliminated at the middle position M1, and is gradually increased toward the tip end Tp in the region between the middle position M1 and the tip end Tp (see the perspective view of FIG. 9).

The circumferential location of the anisotropy creation portion c4 is changed at the middle position M1 from the upper side to the lower side. In the region between the butt end Bt and the middle position M1, the anisotropy creation portion c4 is located on the lower side. In the region between the middle position M1 and the tip end Tp, the anisotropy creation portion c4 is located on the upper side. As a result, the anisotropy creation portion c4 in the region between the middle position M1 and the butt end Bt constitutes a first twist layer t1, and the anisotropy creation portion c4 in the region between the middle position M1 and the tip end Tp constitutes a second twist layer t2.

The inclination of the end application position Pa of the sheet s4 is inverted as compared with that of the sheet s2 in FIG. 8. However, the circumferential position of the end application position Pa of the sheet s4 is different by 180° from that of the sheet s2. As a result, the shape of the anisotropy creation portion c4 when viewed from the upper side coincides with that of the anisotropy creation portion c2 formed by the sheet s2.

As shown in FIG. 5, the sheet s4 constitutes the united sheet s45 and is wound in the state of the united sheet s45. The relationship between the sheet s4 and the sheet s5 is the same as the relationship between the sheet s2 and the sheet s3. Therefore, as with the sheet s3, the sheet s5 also forms the same anisotropy creation portion as that of the sheet s4 when viewed from the upper side.

Thus, the sheet s2, the sheet s3, the sheet s4 and the sheet s5 form respective anisotropy creation portions having the same shape in bending at the circumferential bending position of 90°. Furthermore, anisotropies are enhanced by overlapping the four sheets.

[First Anisotropic Portion and Second Anisotropic Portion]

Figure 10:
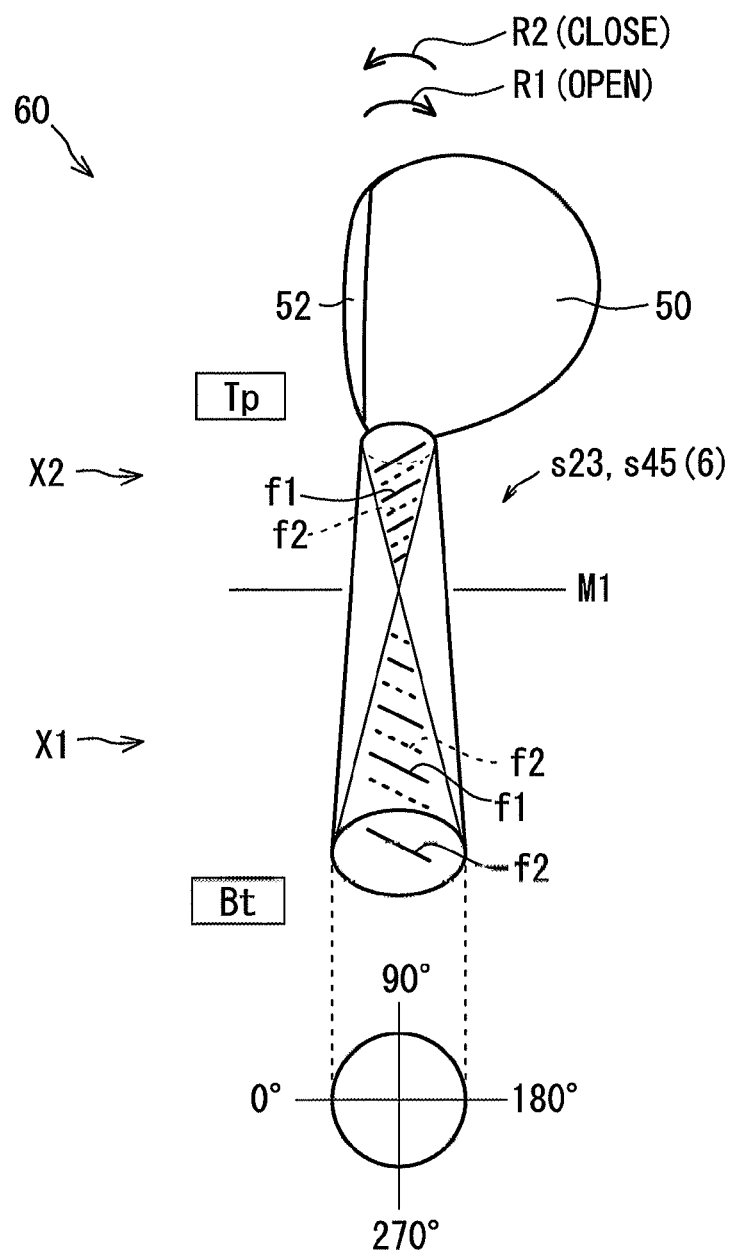
FIG. 10 is a schematic diagram showing a twist direction of a first anisotropic portion and a twist direction of a second anisotropic portion.

FIG. 10 a conceptual diagram showing a golf club 60 including the shaft 6 and a head 50 attached to a tip end Tp side of the shaft 6. FIG. 10 represents the golf club head 60 at address viewed by the golf player.

In the golf club 60, the shaft 6 is attached to the head 50 such that the circumferential position of 90° faces the golf player at address. Therefore, when toe-down occurs, the shaft 6 is bent at the circumferential bending position of 90°.

When the shaft 6 is bent by the toe-down, in the region between the butt end Bt and the middle position M1, the shaft 6 is twisted in a first direction R1 in conjunction with the bending. The first direction R1 is a direction in which a face 52 of the golf club 60 is opened.

On the other hand, when the shaft 6 is bent by the toe-down, in the region between the middle position M1 and the tip end Tp, the shaft 6 is twisted in a second direction R2 in conjunction with the bending. The second direction R2 is a direction in which the face 52 of the golf club 60 is closed.

Thus, the butt side region between the butt end Bt and the middle position M1 is a first anisotropic portion X1 which is twisted in the first direction R1 in conjunction with the bending at the circumferential bending position of 90°. The tip side region between the middle position M1 and the tip end Tp is a second anisotropic portion X2 which is twisted in the second direction R2 in conjunction with the bending at the circumferential bending position of 90°.

A twist-in-bending angle of the whole shaft 6 is the sum of a twist-in-bending angle of the first anisotropic portion X1 and a twist-in-bending angle of the second anisotropic portion X2. These twist-in-bending angles are offset against each other. Therefore, the twist-in-bending angle of the whole shaft 6 is small. When the magnitude of the twist-in-bending angle toward the first direction R1 of the first anisotropic portion X1 is equal to the magnitude of the twist-in-bending angle toward the second direction R2 of the second anisotropic portion X2, the twist-in-bending angle of the whole shaft 6 is zero.

[Advantageous Effects of First Anisotropic Portion and Second Anisotropic Portion]

As described above, a strange feeling at turn brought by swinging a conventional anisotropic shaft can cause a missed shot.

On the other hand, in the shaft 6, the twist accompanied by bending in the first anisotropic portion X1 is offset with the twist accompanied by bending in the second anisotropic portion X2, and thus the twist accompanied by bending in the whole shaft is suppressed. For this reason, feel at turn in swinging the shaft 6 is the same as that of a normal shaft, and thus the strange feeling can be suppressed.

In addition, the shaft 6 can also enjoy the benefit of the twist accompanied by bending. In a general swing, a tip end portion of the shaft 6 tends to be locally bent at impact. This is because the center of gravity of the head 50 is located off the center line of the shaft 6. By a centrifugal force, the head 50 is rotated such that the center of gravity of the head 50 approaches the center line of the shaft 6. This rotation bends the tip end portion, which is close to the head 50, of the shaft 6. Therefore, at impact, the magnitude of bend in the tip side region (second anisotropic portion X2) can be greater than the magnitude of bend in the butt side region (first anisotropic portion X1). In this case, the magnitude of the twist in the second direction R2 is greater than the magnitude of the twist in the first direction R1, which allows the face 52 to be closed. This golf club 60 can contribute to cure a slice.

As known as properties of an anisotropic shaft, when the circumferential bending position is changed by 180°, the direction of the twist is changed to the opposite direction. When the shaft 6 is attached to the head 50 such that the circumferential position of 270° faces the golf player at address, the bending of the shaft 6 by the toe down is the bending at the circumferential bending position of 270°. In this case, the twist in the first direction R1 of the first anisotropic portion X1 closes the face 52, and the twist in the second direction R2 of the second anisotropic portion X2 opens the face 52. This golf club can contribute to cure a hook.

In some swings, a bent portion at impact is not located in the tip end portion of the shaft. In this case, the second anisotropic portion X2 can be disposed on a portion that is bent at impact, and the first anisotropic portion X1 can be disposed on the remaining portion. This structure can suppress the twist accompanied by bending in the whole shaft while taking advantages of the twist accompanied by bending in the second anisotropic portion X2.

The structure including the first anisotropic portion X1 and the second anisotropic portion X2 can produce a non-conventional shaft behavior during swinging. This behavior can have an effect on the feeling of the golf player. The feeling can be adjusted by adjusting the length in the axial direction, the axial-direction position, the circumferential location, and the like of each of the first anisotropic portion X1 and the second anisotropic portion X2. The shaft including the first anisotropic portion X1 and the second anisotropic portion X2 can contribute to improvement in the feeling. The feeling can also be independently changed without changing the orientation of the face at impact by offsetting the twist accompanied by bending in the first anisotropic portion X1 with the twist accompanied by bending in the second anisotropic portion X2.

In the above-described manufacturing method of the shaft 6, specifications of the first anisotropic portion X1 and the second anisotropic portion X2 can be changed. The change to the specifications enables the twist-in-bending angle or the feeling to be adjusted. For example, specifications of the first anisotropic portion X1 and/or the second anisotropic portion X2 can be changed by changing the ply number of the bias layer, the shape of the bias layer, the degree of inclination of the end application position Pa relative to the winding start edge, the degree of displacement between sheets of the united sheet, or the like.

The circumferential location of the anisotropy creation portion can be varied depending on its axial-direction position by winding the bias sheet so that the winding start edge has a helical shape. For efficiently forming the anisotropy creation portion, the circumferential position of the winding start edge at the tip end Tp is preferably different by 0.5 plies (180°) from the circumferential position of the winding start edge at the butt end Bt. In this respect, the end application position Pa is preferably set such that the circumferential position of the winding start edge at the tip end Tp is different by greater than or equal to 170° and less than or equal to 190° from the circumferential position of the winding start edge at the butt end Bt.

The above-described manufacturing method of the shaft 6 is one example for the manufacturing method of a shaft that includes the first anisotropic portion X1 and the second anisotropic portion X2. The manufacturing method of the shaft is not limited. A different bias layer is used for each of the tip side region and the butt side region. For example, a butt partial bias sheet that has a fiber-orientation angle of +θ° and a tip partial bias sheet that is located on the tip end Tp side relative to the butt partial bias sheet and has a fiber-orientation angle of −θ° may be used. In this case, it is not necessary to incline the end application position Pa relative to the winding start edge. The length in the axial direction, the axial-direction position, the ply number, and the circumferential location can be freely set for each of the butt partial bias sheet and tip partial bias sheet.

In the above-described united sheet s23 and united sheet s45, the bias sheets having a ply number of 1.5 are used. The ply number is not limited to 1.5. It is just required for creation of the anisotropy creation portion that the ply number is a non-integer. When the ply number is 1.5, the anisotropy creation portion can be efficiently formed. In addition, the ply number of one bias sheet may be varied depending on the axial-direction position of the bias sheet. The variation of the ply number contributes to change anisotropy depending on the axial-direction position.

[Twist-in-Bending Angle]

Figure 11A:
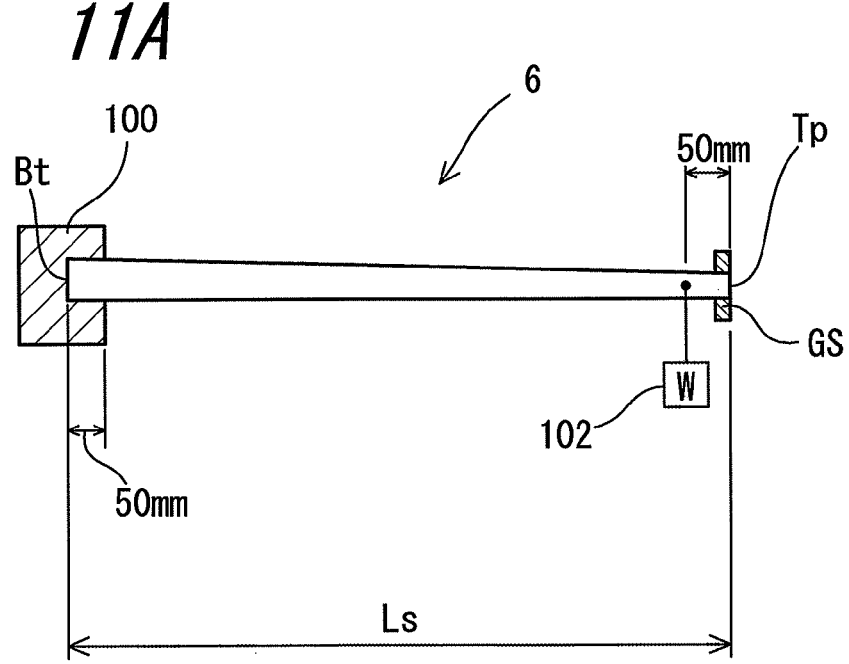
FIG. 11A and FIG. 11B illustrate methods of measuring a twist-in-bending angle.
Figure 11B:
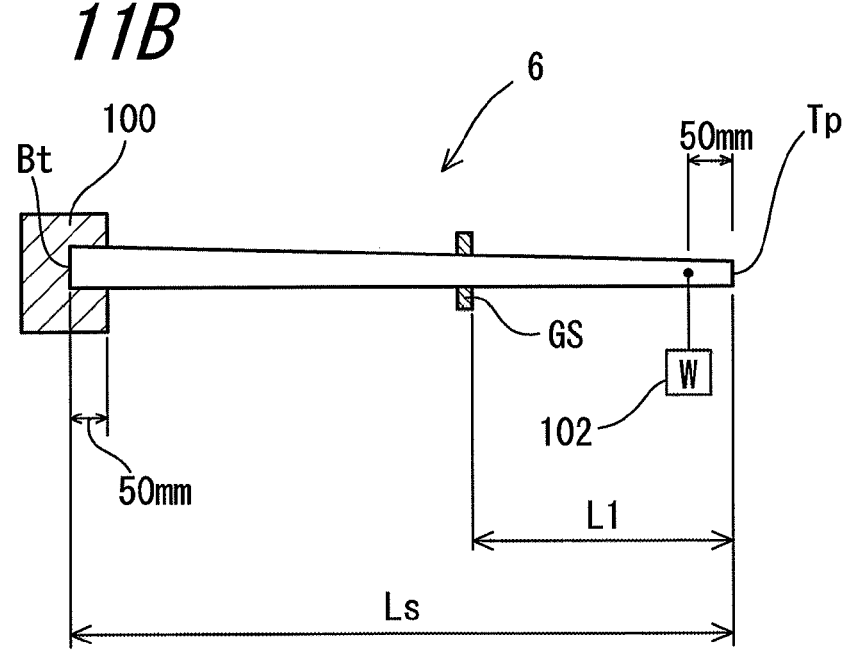

The twist-in-bending angle means a twist angle of a shaft when the shaft is bent by applying a predetermined load. FIG. 11A and FIG. 11B show examples of the method of measuring the twist-in-bending angle.

FIG. 11A shows the method of measuring a twist-in-bending angle θw in the whole shaft. A portion between the butt end Bt and a point separated by 50 mm from the butt end Bt is fixed by using a fixing jig 100. A gyro-sensor GS is attached to the tip end Tp. The gyro-sensor GS is attached to a position at which a rotation angle of the tip end Tp can be measured. The shaft axis of the shaft 6 is horizontal in a state where before a weight 102 is hung. The weight 102 is hung at a position separated by 50 mm from the tip end Tp. The weight 102 has a weight of 1.25 kg. The shaft 6 is bent by the gravity of the weight 102. Angles measured before and after the hanging of the weight 102 are compared to calculate a twist angle caused by the bending. This twist angle is the twist-in-bending angle θw in the whole shaft.

FIG. 11B shows the method of measuring a twist-in-bending angle θb in the butt side region. Difference from the measuring method of the twist-in-bending angle θw is only the position of the gyro-sensor GS. The gyro-sensor GS is attached to a position separated by a distance L1 from the tip end Tp. Angles measured before and after the hanging of the weight 102 are compared to calculate a twist angle caused by the bending. This twist angle is the twist-in-bending angle θb in the butt side region. The twist-in-bending angle θb is a twist-in-bending angle on the butt side relative to the position separated by the distance L1 from the tip end Tp.

A twist-in-bending angle θt in the tip side region is calculated by using the twist-in-bending angle θw and the twist-in-bending angle θb. The twist-in-bending angle θt is a difference (θw−θb). The twist-in-bending angle θt is a twist-in-bending angle on the tip side relative to the position separated by the distance L1 from the tip end Tp.

A circumferential bending position is selected for the measurement of the twist-in-bending angles. The circumferential bending position is set on an upper side in the vertical direction. For example, when a position of 90° in the circumferential direction is the circumferential bending position, the shaft 6 is fixed so that the circumferential position of 90° is located vertically uppermost in the circumferential positions of the shaft 6.

The twist-in-bending angle varies depending on the circumferential bending position. Therefore, a shaft has a maximum value and a minimum value of the twist-in-bending angle θw. When one of the twist angle in the first direction R1 and the twist angle in the second direction R2 is defined as a plus value, and the other is defined as a minus value, then the maximum value is a plus value, and the minimum value is a minus value.

For suppressing the strange feeling at turn in swinging, the twist-in-bending angle θw is preferably small. In this respect, the maximum value of the twist-in-bending angle θw is preferably less than or equal to 1°, more preferably less than or equal to 0.7°, still more preferably less than or equal to 0.5°, still more preferably less than or equal to 0.3°, and yet still more preferably 0°.

It is required only that the middle position M1, which is the boundary between the butt side region and the tip side region, is a position excluding the tip end Tp and the butt end Bt. In light of reducing the twist-in-bending angle θw, the middle position M1 is preferably closer to the center point in the axial direction of the shaft. In this respect, the distance between the tip end Tp and the middle position M1 is preferably greater than or equal to 40% and less than or equal to 60% of the shaft length Ls, and more preferably greater than or equal to 45% and less than or equal to 55% of the shaft length Ls.

EXAMPLES

Example

A shaft of Example that was the same as the shaft 6 was produced. The laminated constitution was as shown in FIG. 3. When the united sheet s23 and the united sheet s45 were respectively wound, the end application positions Pa of those were inclined relative to their winding start edges (FIG. 4 and FIG. 5). The shaft length Ls was 1168 mm.

Comparative Example

When the united sheet s23 and the united sheet s45 were respectively wound, the end application positions Pa of those were not inclined relative to their winding start edges. That is, the end application position Pa of the united sheet s23 was the winding start edge 21, and the end application position Pa of the united sheet s45 was the winding start edge 41. Except for this, a shaft of Comparative Example was produced in the same manner as in Example.

Figure 12:
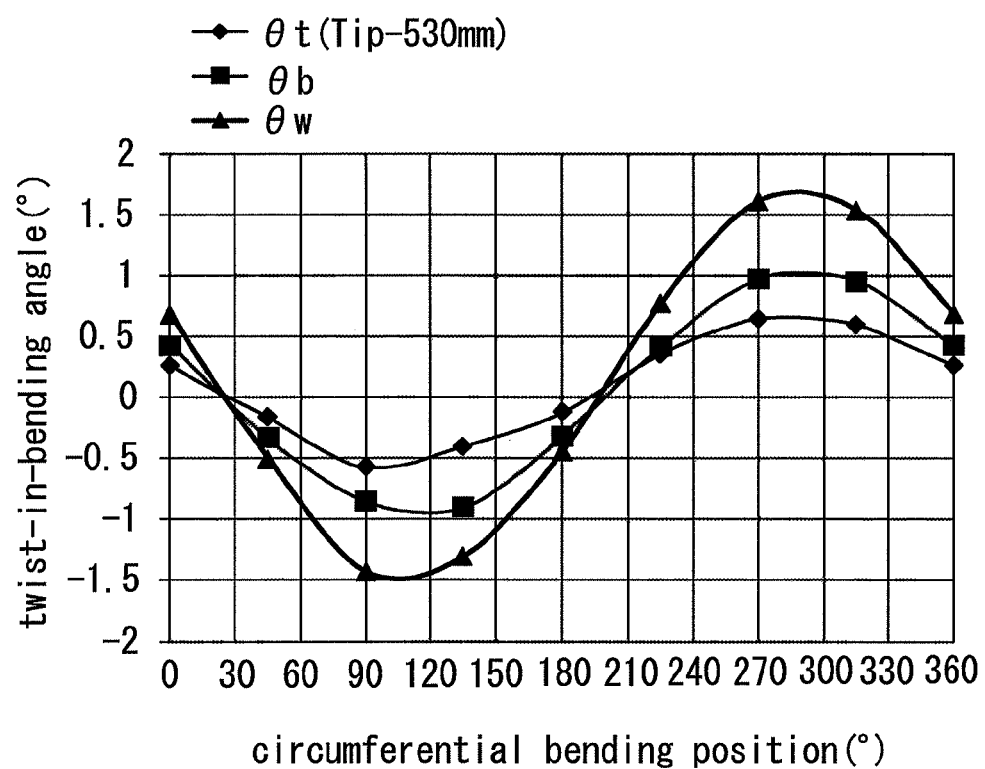
FIG. 12 is a graph showing results of measurements of Comparative Example.
Figure 13:
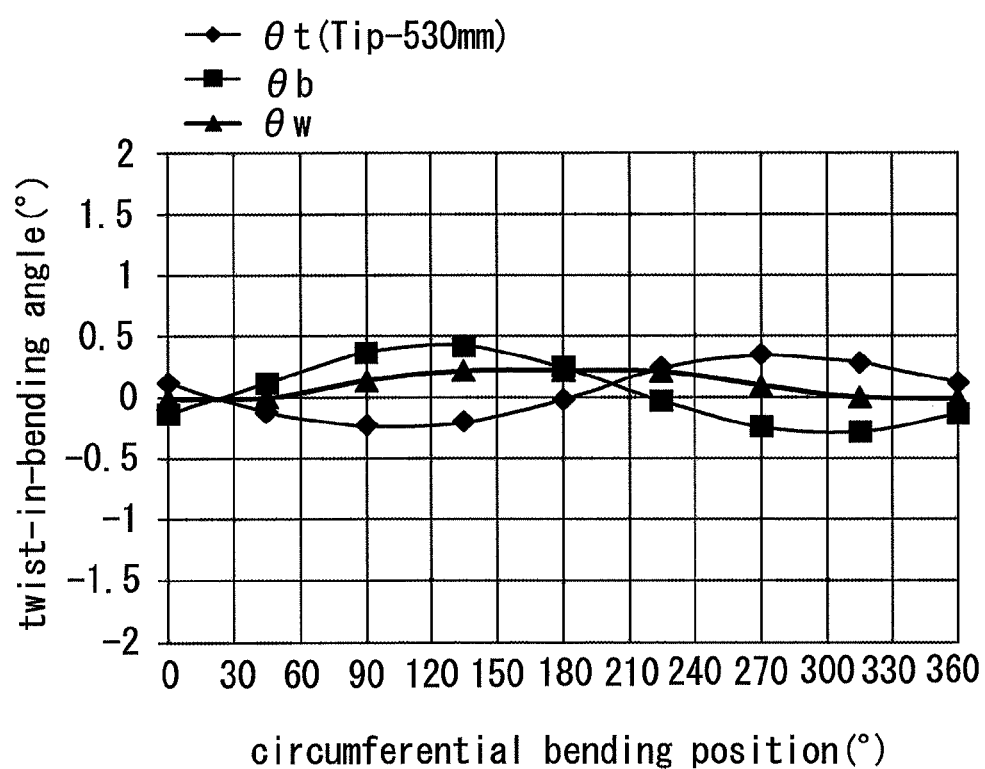
FIG. 13 is a graph showing results of measurements of Example.

Twist-in-bending angles of Example and Comparative Example were measured by the above-described method. The distance L1 shown in FIG. 11B was 530 mm. The measurements were performed at respective circumferential positions of 0°, 45°, 90°, 135°, 180°, 225°, 270° and 315°. FIG. 12 shows results of the measurements of Comparative Example. FIG. 13 shows results of the measurements of Example.

As shown in FIG. 12, in Comparative Example, the twist direction of the twist-in-bending angle θt is the same as the twist direction of the twist-in-bending angle θb. Comparative Example also had a large twist-in-bending angle θw because the twist-in-bending angle θt and the twist-in-bending angle θb were added up. On the other hand, as shown in FIG. 13, in Example, the twist direction of the twist-in-bending angle θt is opposite to the twist direction of the twist-in-bending angle θb, although some slight tolerance was appeared. Example also had a small twist-in-bending angle θw because the twist-in-bending angle θt and the twist-in-bending angle θb were offset against each other. The advantageous effect of Example is clear.

The following clauses are disclosed regarding the above-described embodiments.

[Clause 1]

A golf club shaft comprising:
a tip end;
a butt end;
a first anisotropic portion that is twisted in a first direction in conjunction with a bending of the golf club shaft at a circumferential bending position; and
a second anisotropic portion that is twisted in a second direction in conjunction with the bending, wherein
the second anisotropic portion is located on a tip end side relative to the first anisotropic portion, and
the second direction is opposite to the first direction.

[Clause 2]

The golf club shaft according to clause 1, wherein
a region between a middle position in an axial direction of the golf club shaft and the butt end is defined as a butt side region,
a region between the middle position and the tip end is defined as a tip side region,
the butt side region is the first anisotropic portion, and
the tip side region is the second anisotropic portion.

[Clause 3]

The golf club shaft according to clause 1 or 2, wherein
the golf club shaft further comprises a plurality of layers formed by a fiber reinforced resin,
the plurality of layers include a bias layer, the bias layer includes an anisotropy creation portion that creates anisotropy in the bending,
the anisotropy creation portion includes a first twist layer that creates a twist in the first direction in the bending, and a second twist layer that creates a twist in the second direction in the bending,
the first anisotropic portion includes the first twist layer, and
the second anisotropic portion includes the second twist layer.

[Clause 4]

The golf club shaft according to clause 3, wherein
the first twist layer of the first anisotropic portion is increased toward the butt end, and
the second twist layer of the second anisotropic portion is increased toward the tip end.

[Clause 5]

The golf club shaft according to clause 3 or 4, wherein
the bias layer includes a layer having a ply number of a non-integer, and
the layer having a ply number of a non-integer includes a winding start edge that is inclined relative to the axial direction.

The above description is merely illustrative and various modifications can be made without departing from the principles of the present disclosure.

What is claimed is:
1. A golf club shaft comprising:
a tip end;
a butt end;
a plurality of layers formed by a fiber reinforced resin, wherein
the plurality of layers include a bias layer,
the bias layer includes a sheet layer having a ply number of a non-integer greater than 1, the sheet layer includes a winding start edge that is inclined relative to an axial direction of the golf club shaft, the bias layer includes an anisotropy creation portion that creates anisotropy in conjunction with a bending of the golf club shaft at a circumferential bending position, the anisotropy creation portion includes a first twist portion that creates a twist in a first direction with respect to the circumferential bending position, and a second twist portion that creates a twist in a second direction with respect to the circumferential bending position, wherein the second direction is opposite to the first direction, a first anisotropic portion of the golf club shaft includes the first twist portion, a second anisotropic portion of the golf club shaft includes the second twist portion, and the second anisotropic portion is located on a tip end side relative to the first anisotropic portion.

2. The golf club shaft according to claim 1, wherein a region between a middle position in an axial direction of the golf club shaft and the butt end is defined as a butt side region, a region between the middle position and the tip end is defined as a tip side region, the butt side region is the first anisotropic portion, and the tip side region is the second anisotropic portion.

3. The golf club shaft according to claim 2, wherein a distance between the tip end and the middle position is greater than or equal to 40% and less than or equal to 60% of a length of the golf club shaft.

4. The golf club shaft according to claim 2, wherein a twist direction of a twist-in-bending angle $\theta b$ in the butt side region is opposite to a twist direction of a twist-in-bending angle $\theta t$ in the tip side region.

5. The golf club shaft according to claim 4, wherein a twist-in-bending angle $\theta w$ in a whole golf club shaft is suppressed to less than or equal to 0.5° by offsetting the twist-in-bending angle $\theta b$ with the twist-in-bending angle $\theta t$.

6. The golf club shaft according to claim 1, wherein the first twist portion of the first anisotropic portion is increased toward the butt end, and the second twist portion of the second anisotropic portion is increased toward the tip end.

7. The golf club shaft according to claim 1, wherein the sheet layer includes a winding start edge that has a helical shape.

8. The golf club shaft according to claim 7, wherein the sheet layer includes a winding finish edge that has a helical shape.

9. The golf club shaft according to claim 7, wherein a circumferential position of the winding start edge at the tip end is different by greater than or equal to 170° and less than or equal to 190° from a circumferential position of the winding start edge at the butt end.

10. The golf club shaft according to claim 1, wherein an absolute angle of fiber of the bias layer is greater than or equal to 15 degrees and less than or equal to 75 degrees relative to an axial direction of the golf club shaft.

11. The golf club shaft according to claim 1, wherein an absolute angle of fiber of the bias layer is greater than or equal to 20 degrees and less than or equal to 45 degrees relative to an axial direction of the golf club shaft.

* * * * *